United States Patent [19]

Nikles et al.

[11] Patent Number: 5,096,742
[45] Date of Patent: Mar. 17, 1992

[54] HIGH TEMPERATURE, HIGH HUMIDITY STABILIZATION PROCESS FOR OPTICAL INFORMATION STORAGE MEDIA CONTAINING POLYCARBONATE SUBSTRATES

[75] Inventors: David E. Nikles, Colonia; Charles E. Forbes, Florham Park, both of N.J.

[73] Assignee: Hoechst Celanese Corp., Somerville, N.J.

[21] Appl. No.: 462,257

[22] Filed: Jan. 9, 1990

[51] Int. Cl.$^5$ ............................ B05D 5/06; B05D 3/02
[52] U.S. Cl. ..................................... 427/164; 427/316; 427/314; 427/322; 427/162
[58] Field of Search ............... 427/164, 314, 316, 162, 427/168, 322; 428/64

[56] References Cited

U.S. PATENT DOCUMENTS

| | | | |
|---|---|---|---|
| 4,770,923 | 9/1988 | Wasa et al. | 428/212 |
| 4,783,347 | 11/1988 | Doin et al. | 427/379 |
| 4,815,962 | 3/1989 | Cardone | 427/38 |
| 4,997,744 | 3/1991 | Kalyanaraman et al. | 430/271 |

*Primary Examiner*—Shrive Beck
*Assistant Examiner*—Roy V. King
*Attorney, Agent, or Firm*—P. S. Kalyanaraman

[57] ABSTRACT

Provided is a method for stabilizing an optical recording medium containing a polycarbonate substrate. The method comprises treating the substrate material in a high temperature, high humidity environment for an extended period of time. Dramatic improvements in the useful life of the optical recording medium in which the treated polycarbonate substrate is used have been found to result.

12 Claims, 1 Drawing Sheet

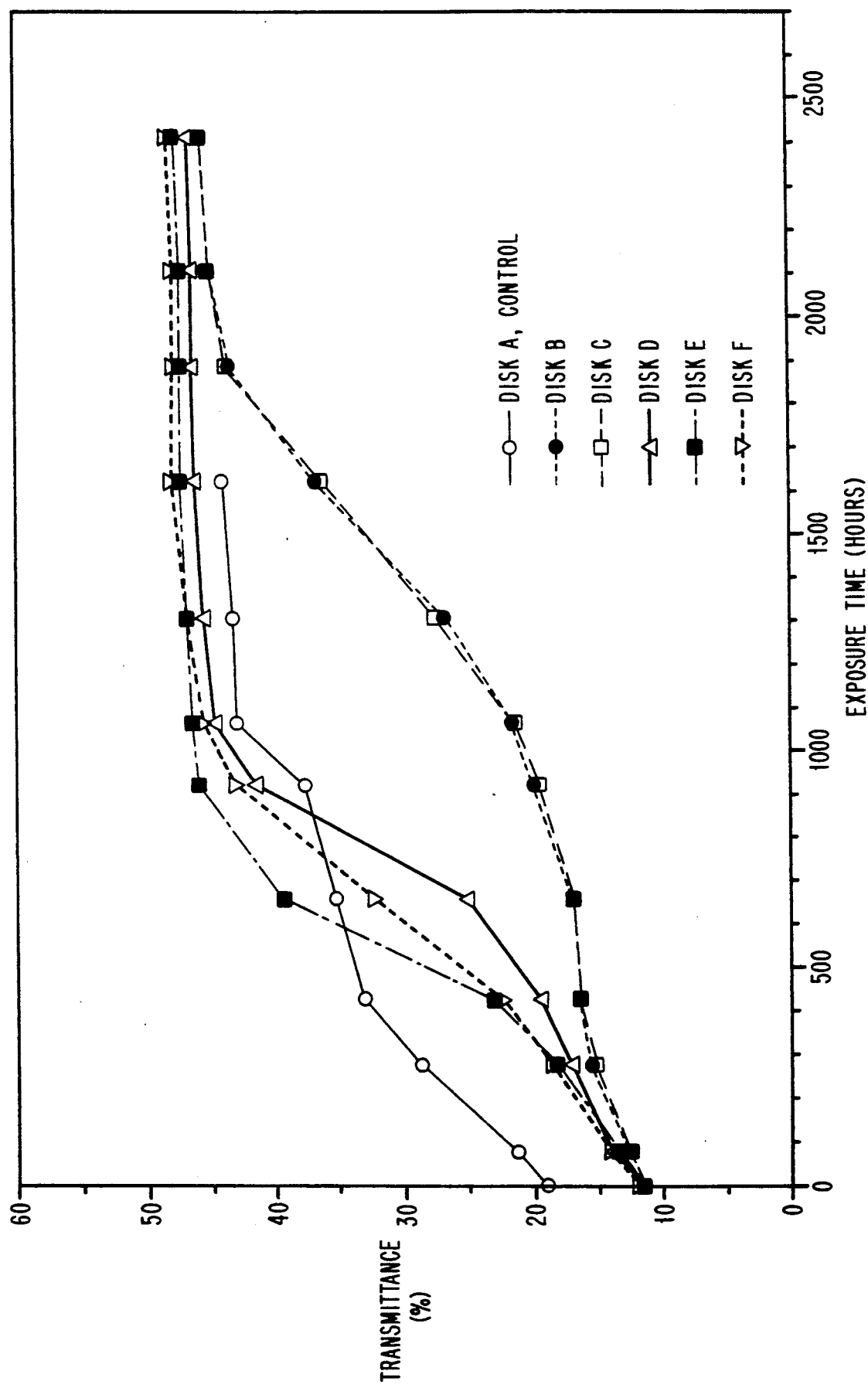

HIGH TEMPERATURE, HIGH HUMIDITY STABILIZATION PROCESS FOR OPTICAL INFORMATION STORAGE MEDIA CONTAINING POLYCARBONATE SUBSTRATES

BACKGROUND OF THE INVENTION

The present invention relates to a process for stabilizing optical information storage media. More particularly this invention relates to a process for stabilizing optical information storage media containing polycarbonate substrates by delaying the onset of degradation in the optical properties of the media.

Typical substrate materials used in the manufacture of optical recording media include acrylic resins, methacrylic resins, polystyrene resins, polycarbonate resins, cellulose resins, polyester resins, polyamide resins, polyolefin resins, epoxy resins, polyimide resins, cellulose triacetate, cellulose acetate butylate, polymethylpentene, and polyethylene terephthalate. Among the most preferred substrates are the polycarbonate substrates, due to their excellent optical properties and physical stability. Despite the excellent properties of the substrate per se, however, degradation of the optical properties of the optical medium over time, for whatever reason, can cut short the lifetime of the optical information medium in which the substrate is incorporated. Many different and complicated technologies have been used in an attempt to solve this problem and thereby extend the useful life of the media.

For example, U.S. Pat. No. 4,571,314 to Suzuki et al, discloses coating at least one inner surface of a casting mold with a radiation-curable or thermosetting resin, curing the resin to form a coating film on the mold surface or surfaces, casting into the mold an epoxy resin composition comprising an alicyclic epoxy resin or a mixture of an alicyclic epoxy resin and an aromatic epoxy resin, an organic polybasic acid anhydride, a curing accelerator and an anti-discoloring (anti-oxidative) agent, and heat-curing the epoxy resin composition to transfer the coating film on the mold to the surface of the cured product of the epoxy resin composition, thereby forming a double or triple layer cast laminate. This process is alleged to provide a physically stable and scratch-resistant substrate more reliably than the more conventional process of first molding a polymethylmethacrylate or polycarbonate substrate and subjecting same to a surface-hardening treatment.

Other methods for increasing the chemical and mechanical stability of optical disk structures have included the use of a protective layer (Japanese Patent Application Laid Open Nos. 57-60542 and 57-66541), and the use of a complicated "sandwich structure".

Because of the potential value of stable optical recording media, and in particular stable optical information media containing polycarbonate substrates, it would be advantageous if improved stability in terms of extended useful life of the media, could be realized easily and inexpensively without the need for complicated and expensive structures, reaction steps or chemical treatments.

Accordingly, it is an object of the present invention to provide a simple and commercially viable method for improving the stability of optical recording media using polycarbonate.

Another object of the present invention is to provide an optical information storage medium exhibiting improved overall lifetime stability.

It is yet another object of the present invention to provide a process for preparing an optical information storage medium comprising a polycarbonate substrate which exhibits a longer useful life and which also exhibits improved performance over time.

These and other objects, as well as the scope, nature, and utilization of the invention, will be apparent to those skilled in the art from the following description and the appended claims.

SUMMARY OF THE INVENTION

In accordance with the foregoing objectives, there is provided a simple and novel method for stabilizing an optical recording medium containing a polycarbonate substrate, which comprises treating the substrate material in a high temperature, high humidity environment for an extended period of time, i.e., a pre-aging treatment. For example, by exposing a polycarbonate substrate to 80.C/80% RH for a period of time of less than 600 hours, and most preferably less than 500 hours, dramatic improvements in the stability of the optical reading medium in which the polycarbonate substrate is used have been found to result.

Thus, in another embodiment of the present invention, there is provided an optical information storage medium which is prepared by coating a suitable optical information material onto a polycarbonate substrate treated in accordance with the present invention. The surprising stability of the overall medium due to the presence of the treated polycarbonate medium enhances the desirability and commercial viability of the optical information storage medium.

BRIEF DESCRIPTION OF THE DRAWING

The Figure of the Drawing graphically depicts the transmittance of various optical disks measured at 830 nm, which disks were subjected to an accelerated aging study with the transmittance being measured at selected time intervals.

DETAILED DESCRIPTION OF THE PREFERRED EMBODIMENTS

The present invention contemplates a simple, yet effective treatment of a polycarbonate substrate which comprises subjecting the polycarbonate substrate to a high temperature, high humidity environment for an extended period of time. In effecting the treatment, the untreated polycarbonate substrate is simply placed in a chamber where the temperature and humidity of the surrounding environment can be monitored and maintained at a desired level. The optical information medium is then assembled using the treated polycarbonate substrate. For it has been surprisingly found that when the treated polycarbonate substrate is used in an optical information medium, the medium exhibits an extended useful life as manifested in a delay of the onset of degradation in the reflectance and transmittance factors of the medium.

The temperature and humidity of the substrate treatment environment both play an important part in the substrate treatment. The temperature and humidity combination is preferably such that the stability of the medium containing the treated substrate is maximized through treatment, but not such that the lifetime is deleteriously effected. Accordingly, the preferred temperature for treatment of the substrate material ranges from about 60° C. to about 100° C., more preferably from about 70° C. to about 90° C., and most preferably about 80° C. The preferred relative humidity (RH) for use in the treatment of the substrate material ranges from about 65% to about 95%, more preferably from about 70% to about 90%, and most preferably about 80%. The most preferred environment for treatment would involve a temperature of 80° C. together with 80% relative humidity.

The treatment at the chosen temperature and relative humidity is conducted for an extended length of time. Too long of a pre-aging treatment, however, could detrimentally effect the useful life of any optical recording medium made with the polycarbonate substrate. The preferred time for treatment of the substrate, therefore, is any time less than 600 hours, and more preferably less than 500 hours, e.g., ranging from about 75 hours to about 500 hours. The most preferred treatment would be for a length of time ranging from about 200-500 hours, at 80° C./80% RH.

The polycarbonate substrate material can be any polycarbonate containing base. The substrate can be made from a composition which is totally a polycarbonate, or a blend of copolymer of a polycarbonate and another polymer. For example, the polycarbonate can be blended with a polyvinyl aromatic polymer such as polystyrene, or can be copolymerized, for example, as in U.S. Pat. No. 4,680,374. As well, the polycarbonate used in preparing the substrate can be chemically modified in various manners, e.g., by the addition of functional groups to the polymer chain. Additives, such as antioxidants, can also be used to supplement the polycarbonate in forming the substrate.

The most preferred type or grade of polycarbonate for use as the substrate in an optical recording medium is a "CD grade" polycarbonate, which is well recognized in the industry. See, e.g., "Molding Compounds for Optical Disk Substrates" by Kato et al, SPIE, Vol. 695, Optical Mass Data Storage II (1986). This grade of polycarbonate has particularly desirable optical properties, including excellent optical transmittance and a capability to provide molded objects with low birefringence. Commercially, such grades of polycarbonate are available under the mark LEXAN and MARKOLON from General Electric and Mobay respectively. The polycarbonate used in preparing the substrate of an optical recording medium can be modified or supplemented as discussed above.

The effectiveness of the treatment, and hence the useful life of the optical information medium, can be gauged by observing the transmission and reflectance factors of the medium over time as measured under accelerated aging conditions. An increase in stability realized by the treatment is reflected by a decelerated increase over time in the transmission factor(T) and/or a decelerated decrease over time in the reflectance factor(R). A slowed change over time in the transmission and reflectance factors indicate a prolongation of the useful lifetime of the optical information storage medium. The overall increase in stability of the optical information storage medium can vary with the temperature and humidity conditions, and the length of time the substrate has been treated.

The optical information storage medium according to the present invention comprises a treated polycarbonate substrate and an optical information layer. When desired, a subbing layer may be employed on the substrate or a protective layer or cover can be formed on or over the recording layer.

The substrate materials may be provided with a tracking groove for guiding the laser beam. The groove can be generated by any conventional method known in the art, but is preferably generated upon injection molding of the substrate. It is a preferred embodiment of the present invention to use a pre-grooved substrate.

Materials for forming the recording layer can be any of the conventional organic or inorganic materials. Organic materials are generally superior to metallic materials in respect to ease of application, as well as oxygen-resistance and stability, and are therefore preferred. Among the organic materials, naphthalocyanine, phthalocyanine, porphyrin, anthracyanine, and phenanthracyanine chromophores are particularly preferred because of their absorbance, and chemical and photolytic stability. Any appropriate naphthalocyanine, phthalocyanine, anthracyanine, or phenanthracyanine chromophore which is known in the art may be used, with the most preferred chromophore being a naphthalocyanine chromophore, particularly a silicon naphthalocyanine chromophore. Such chromophores which provide a smooth homogeneous, defect-free, no-noise film upon casting on a substrate are of particular preference.

It is possible to use the chromophore in preparing the information layer alone or in combination with a suitable and film-forming polymer. A combination of the chromophore and film-forming polymer requires that the chromophore be dissolved in a solvent together with the polymer and cast together as a film on the surface of the treated substrate. The film must provide a very flat surface in order to successfully be a recording layer and avoid errors and noise. In order to facilitate the coating procedure for a polymer/chromophore combination, it is generally advantageous that the polymer and chromophore be soluble in a readily available organic solvent such as an alcohol or ketone. Also, upon evaporation of the solvent, the chromophore should not precipitate in a particulate form, which particulates would cause a scattering of light. It is preferred to use a chromophore which is self-casting and cast the chromophore layer without a film-forming polymer, although the polycarbonate substrate can be successfully coated with a polymer/chromophore film.

Any suitable coating technique may be used to obtain the recording layer, with a conventional technique such as spin coating, which allows for a high degree of control of film thickness and flatness, being preferred. It is, of course, important that a thin film coating be formed.

The polycarbonate substrate which is coated should generally posses a surface of suitable smoothness. This maybe imparted by appropriate molding or other forming techniques when the substrate is made. If the substrate has an inadequately smooth surface, a smoothing or subbing polymer layer may be used to attain the appropriate smoothness. Such a smoothing or subbing layer should not, of course, interfere with application or utilization of the recording layer which is subsequently applied thereto. The subbing layer can contain preformatting information.

A suitable protective layer or cover, such as those known to the art, can also be used if desired to protect the recording layer from dirt, dust, scratches or abrasion.

A pair of the thus fabricated recording mediums can also be superimposed in such a manner that each recording layer comes to face each other so as to form an air space therebetween, thereby constructing a sealed air-sandwich type recording medium. Alternatively, a sealed sandwich type recording medium can be constructed by tightly sealing a pair of the recording mediums with the above-mentioned protective layer interposed therebetween.

The following examples are given to demonstrate the practice of the high temperature, high humidity treatment process and the results of the treatment on the useful life of optical information media comprised of the treated polycarbonate substrate. It is understood that these examples are given by way of illustration and are not meant to limit the disclosure or the claims to follow.

EXAMPLE 1

A group of 10 blank, pre-grooved polycarbonate optical disk substrates were treated in a controlled temperature/humidity chamber, i.e., a Tenney chamber, available from Engineering, Inc., Union, New Jersey, at a temperature of 80.C and at a relative humidity of 80%. Two blank substrates at a time were removed from the chamber after different predetermined lengths of time and placed in containers in order to protect them from aging or impurities in the atmosphere. When all of the substrates had been removed from the controlled temperature/humidity chamber, they were all coated with a silicon naphthalocyanine information layer, and made into five air sandwich optical disks.

The air sandwich optical disks were then subjected to an accelerated aging study, as the disks were aged at 65° C. and 80% RH. One control air sandwich disk, i.e., a similar disk but using non-treated polycarbonate substrates, was also subjected to the accelerated aging study.

Table 1 below displays the results of the accelerated aging study on the set of optical disks aged at 65° C./80% RH. Column I of the table lists the optical disks and the length of time at which the particular disk was treated in the 80° C./80% RH environment. The second column lists the length of time the disk was subjected to the 65° C./80% RH accelerated aging study and at which time a reading was taken. The third and fourth columns list the transmission and reflectance factors for each disk corresponding to each exposure time. The results of the transmittance (%) readings are graphically depicted in the Figure of the Drawing.

TABLE 1

| DISK | EXPOSURE TIME (HRS) | T % | R % |
|---|---|---|---|
| A | 0.0 | 19.1 | 22.6 |
| Control, No | 76.0 | 21.4 | 20.2 |
| pretreatment | 277.6 | 38.2 | 14.3 |
|  | 428.6 | 42.1 | 13.4 |
|  | 660.1 | 40.9 | 11.9 |
|  | 927.2 | 42.3 | 11.4 |
|  | 1070.4 | 42.9 | 11.4 |
|  | 1308.7 | 43.2 | 11.2 |
|  | 1623.7 | 44.0 | 11.2 |
|  | 1766.4 | 44.0 | 11.1 |
| B | 0.0 | 11.2 | 20.1 |
| treated 288 hr | 76.0 | 12.7 | 19.9 |
|  | 277.6 | 15.6 | 20.1 |
|  | 428.6 | 16.5 | 19.7 |
|  | 660.1 | 17.0 | 17.6 |
|  | 927.2 | 20.0 | 16.5 |
|  | 1070.4 | 21.6 | 16.1 |
|  | 1308.7 | 26.7 | 14.5 |
|  | 1623.7 | 36.7 | 12.5 |
|  | 1887.2 | 43.4 | 11.6 |
|  | 2107.7 | 44.8 | 11.4 |

TABLE 1-continued

| DISK | EXPOSURE TIME (HRS) | T % | R % |
|---|---|---|---|
|  | 2410.9 | 45.5 | 11.3 |
| C | 0.0 | 11.3 | 20.2 |
| treated 408 hr | 76.0 | 12.6 | 20.1 |
|  | 277.6 | 15.3 | 20.1 |
|  | 428.6 | 16.4 | 19.6 |
|  | 660.1 | 16.9 | 17.6 |
|  | 927.2 | 19.6 | 16.5 |
|  | 1070.4 | 21.4 | 16.2 |
|  | 1308.7 | 27.5 | 14.3 |
|  | 1623.7 | 36.2 | 12.7 |
|  | 1887.2 | 43.6 | 11.5 |
|  | 2107.7 | 44.9 | 11.4 |
|  | 2410.9 | 45.5 | 11.3 |
| D | 0.0 | 11.3 | 20.1 |
| treated 576 hr | 76.0 | 14.0 | 19.7 |
|  | 277.6 | 17.2 | 19.6 |
|  | 428.6 | 19.6 | 18.8 |
|  | 660.1 | 25.2 | 15.4 |
|  | 927.2 | 41.5 | 12.1 |
|  | 1070.4 | 44.7 | 11.9 |
|  | 1308.7 | 45.5 | 11.8 |
|  | 1623.7 | 46.2 | 11.7 |
|  | 1887.2 | 46.3 | 11.6 |
|  | 2107.7 | 46.4 | 11.6 |
|  | 2410.9 | 46.6 | 11.5 |
| E | 0.0 | 11.4 | 20.4 |
| treated 816 hr | 76.0 | 13.4 | 19.5 |
|  | 277.6 | 18.2 | 19.8 |
|  | 428.6 | 23.0 | 18.5 |
|  | 660.1 | 39.2 | 13.0 |
|  | 927.2 | 45.8 | 12.0 |
|  | 1070.4 | 46.3 | 11.9 |
|  | 1308.7 | 46.7 | 11.8 |
|  | 1623.7 | 47.2 | 11.8 |
|  | 1887.2 | 47.2 | 11.8 |
|  | 2107.7 | 47.2 | 11.7 |
|  | 2410.9 | 47.6 | 11.7 |
| F | 0.0 | 11.9 | 20.3 |
| treated 816 hr | 76.0 | 14.0 | 19.7 |
|  | 277.6 | 18.5 | 19.5 |
|  | 428.6 | 22.4 | 18.5 |
|  | 660.1 | 32.1 | 14.1 |
|  | 927.2 | 42.9 | 12.3 |
|  | 1070.4 | 45.5 | 12.0 |
|  | 1308.7 | 46.7 | 11.8 |
|  | 1623.7 | 47.8 | 11.7 |
|  | 1887.2 | 47.6 | 11.7 |
|  | 2107.7 | 47.7 | 11.6 |
|  | 2410.9 | 48.0 | 11.7 |

As can be seen from the foregoing results, the deterioration in optical properties of the optical disk is slowed considerably when a polycarbonate substrate is used which has been subjected to the treatment of the present invention. The most significant beneficial effect is observed for those disks using substrates subjected to the treatment for 288 and 408 hours. The control disk initially exhibited substantially poorer optical properties and continued to exhibit poorer optical properties for quite some time under the accelerated aging test as compared to the disks using treated polycarbonate substrates.

While the invention has been described with preferred embodiments, it is to be understood that variations and modification may be resulted to as will be apparent to those skilled in the art. Such variations and modifications are to be considered within the purview and the scope of the claims appended hereto.

What is claimed is:

1. A method for preparing an optical information storage medium which comprises:
    (a) treating a polycarbonate substrate in an environment of a temperature which ranges from about 60°

C. to about 100° C. and a relative humidity which ranges from about 65% to about 95%, for a period of time ranging from about 75 hours to about 600 hours, and (b) coating the treated polycarbonate substrate with a suitable optical information material.

2. The method of claim 1, wherein the temperature ranges from about 70° C. to 90° C.

3. The method of claim 1, wherein the humidity ranges from about 70% to about 90%.

4. The method of claim 1, wherein the period of time ranges from about 75 to 500 hours.

5. The method of clam 1, wherein the period of time ranges from about 200 to 500 hours.

6. The method of claim 1 wherein the optical information material comprises an organic chromophore.

7. The method of claim 6, wherein the optical information material comprises a naphthalocyanine, phthalocyanine, anthracyanine, phenanthracyanine, or porphyrin chromophore.

8. The method of claim 1, wherein the substrate is coated with an optical recording material by spin coating.

9. The method of claim 1, wherein the optical information storage medium is in the form of a disk.

10. The method of claim 1, wherein the optical information storage medium further comprises a protective layer or cover.

11. The method of claim 1, further comprising superimposing two fabricated recording mediums to form an air space therebetween and form an air-sandwich type optical information storage medium.

12. A method of preparing an optical information medium which comprises:
(a) treating a polycarbonate substrate in an environment of a temperature which ranges from about 70° C. to about 90° C. and a relative humidity which ranges from about 70% to about 90%, for a period of time ranging from about 200 hours to about 500 hours, and
(b) coating the treated polycarbonate substrate with a suitable optical information material.

* * * * *